United States Patent [19]

Gittle

[11] Patent Number: 4,743,209

[45] Date of Patent: May 10, 1988

[54] COMPARTMENTALIZED SPLICE CASE

[75] Inventor: Alan L. Gittle, New Brunswick, N.J.

[73] Assignee: Penn Central Telecommunications Company, Woodcliff Lake, N.J.

[21] Appl. No.: 865,297

[22] Filed: May 21, 1986

[51] Int. Cl.⁴ ............................................. H01R 13/52
[52] U.S. Cl. .................................... 439/521; 439/284; 174/92; 174/93
[58] Field of Search ................. 339/116 R, 116 C, 36, 339/198 J, 206 R, 94 R, 94 A, 94 M; 174/88 R, 88 S, 92, 93; 439/521, 284, 285, 286, 287, 289, 290, 291, 292, 201, 202

[56] References Cited

U.S. PATENT DOCUMENTS

| | | | |
|---|---|---|---|
| 2,437,358 | 3/1948 | Mowery | 439/284 |
| 3,066,274 | 11/1962 | Ellis | 174/88 R |
| 3,080,544 | 3/1963 | Stott et al. | 439/289 |
| 3,112,148 | 11/1963 | Wochner | 339/116 C |
| 4,166,663 | 9/1979 | Walker | 439/289 |
| 4,381,425 | 4/1983 | Maricevic et al. | 174/93 |
| 4,390,744 | 6/1983 | Suffi et al. | 174/93 |
| 4,398,781 | 8/1983 | Dan | 339/116 R |
| 4,500,980 | 2/1985 | Copeland | 439/284 |
| 4,519,014 | 5/1985 | Skovran et al. | 174/93 |
| 4,538,021 | 8/1985 | Williamson | 174/92 |
| 4,549,040 | 10/1985 | Goetter | 174/92 |

Primary Examiner—Gil Weidenfeld
Assistant Examiner—Thomas M. Kline
Attorney, Agent, or Firm—Hopgood, Calimafde, Kalil, Blaustein & Judlowe

[57] ABSTRACT

A specially constructed partition member subdivides a splice case into separate hermetically isolated compartments. A plurality of insulated conductors are wired through the partition member, with seals therebetween, and optionally fitted with multi-pair plug connectors at one or both ends. Incoming cables are fitted, as needed, with plug connectors for separable connection to any mating connectors on the pass through conductors on the respective side of the partition member. The parts of the splice case housing are independently separable from the partition member to permit reentry and access to any compartment.

18 Claims, 4 Drawing Sheets

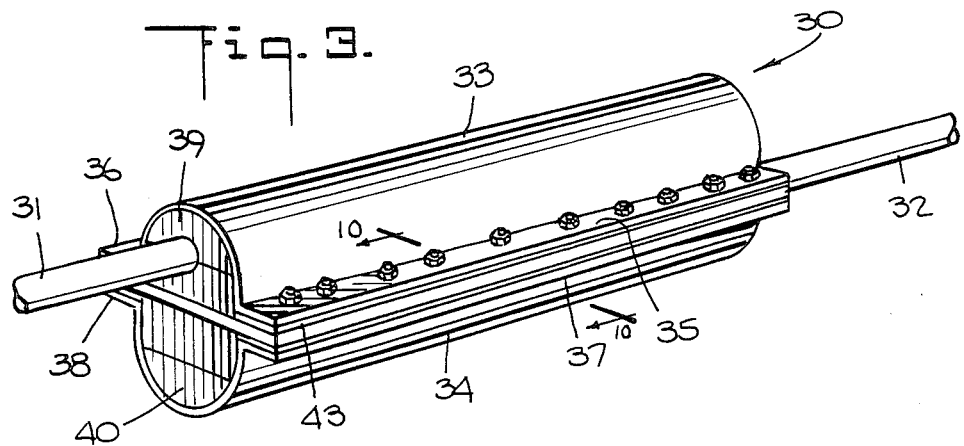
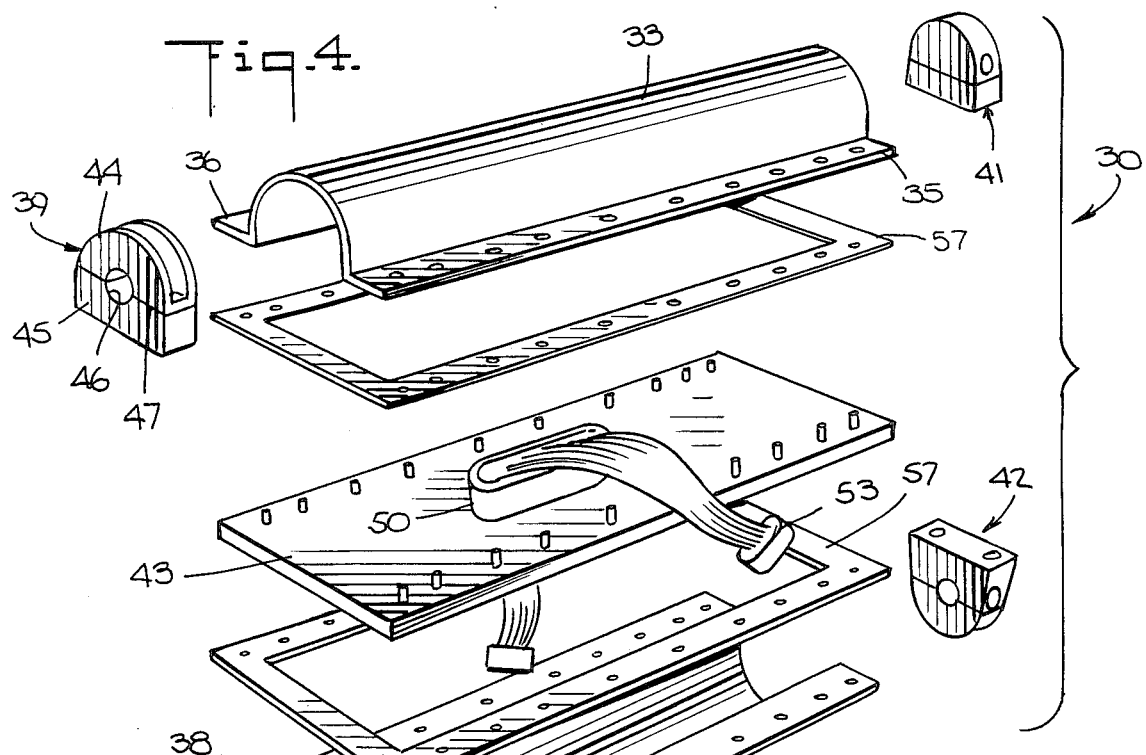
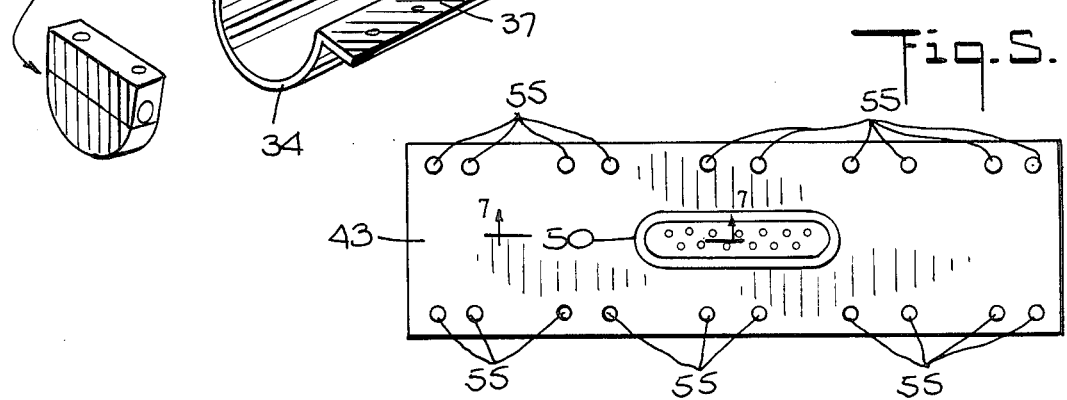

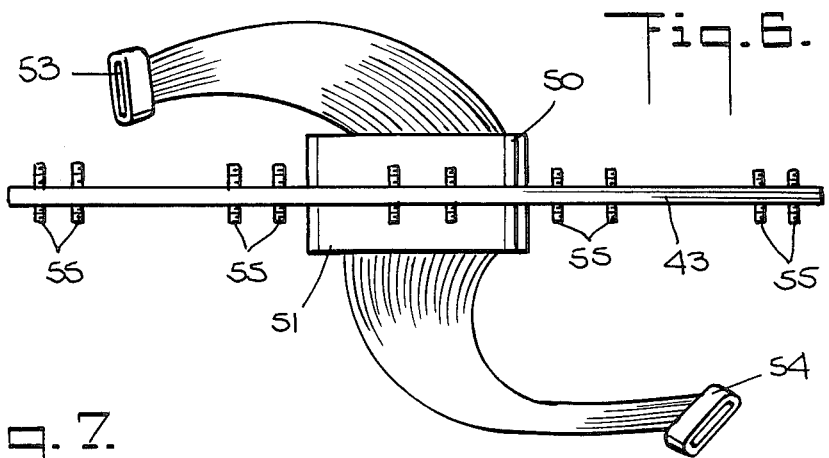
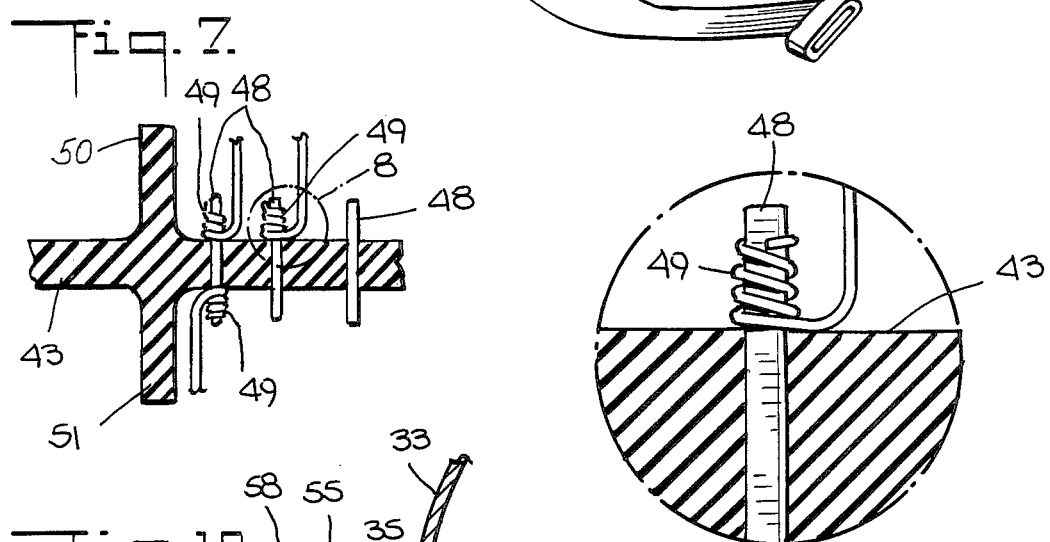
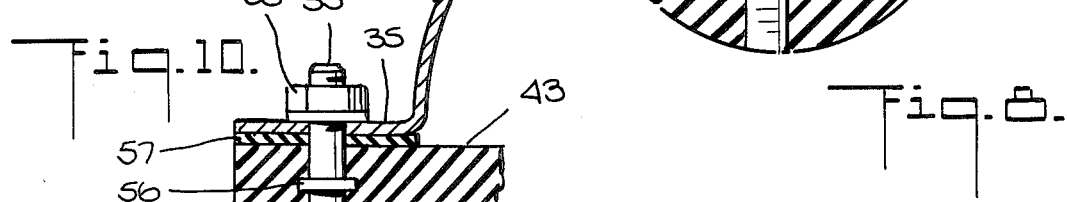
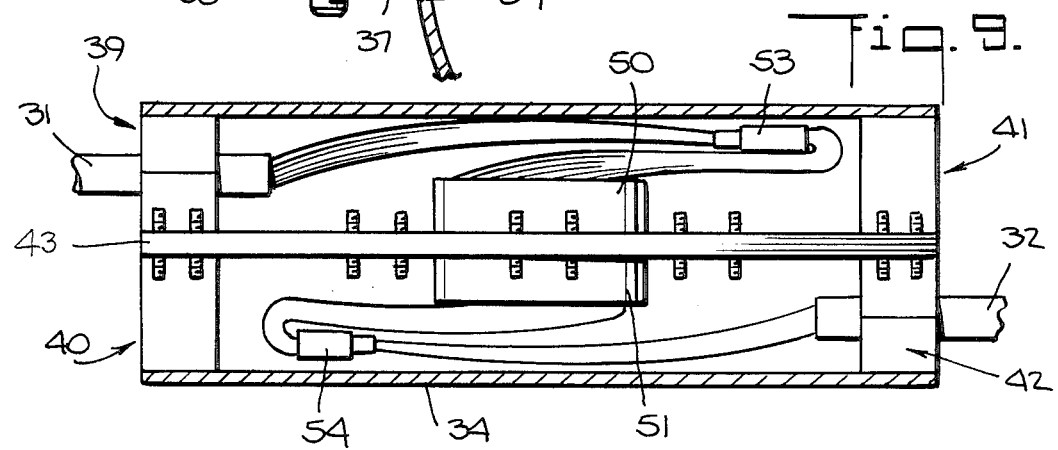

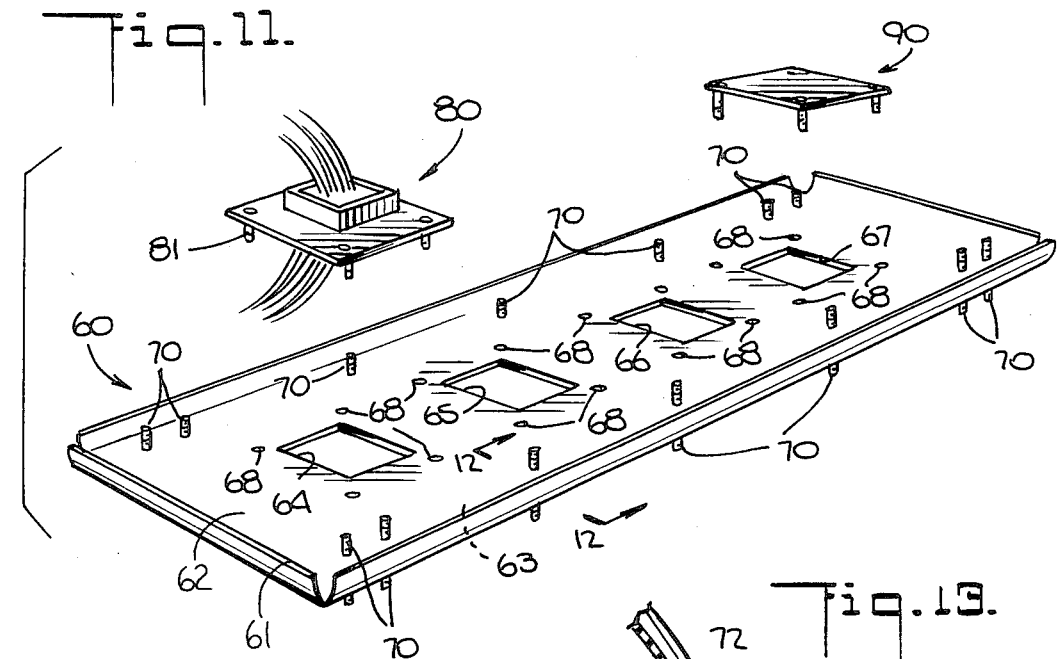
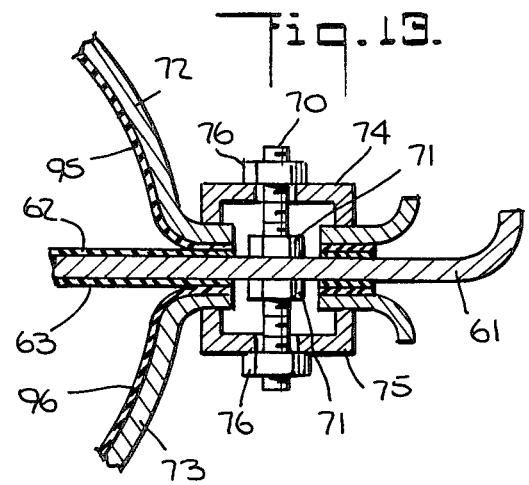
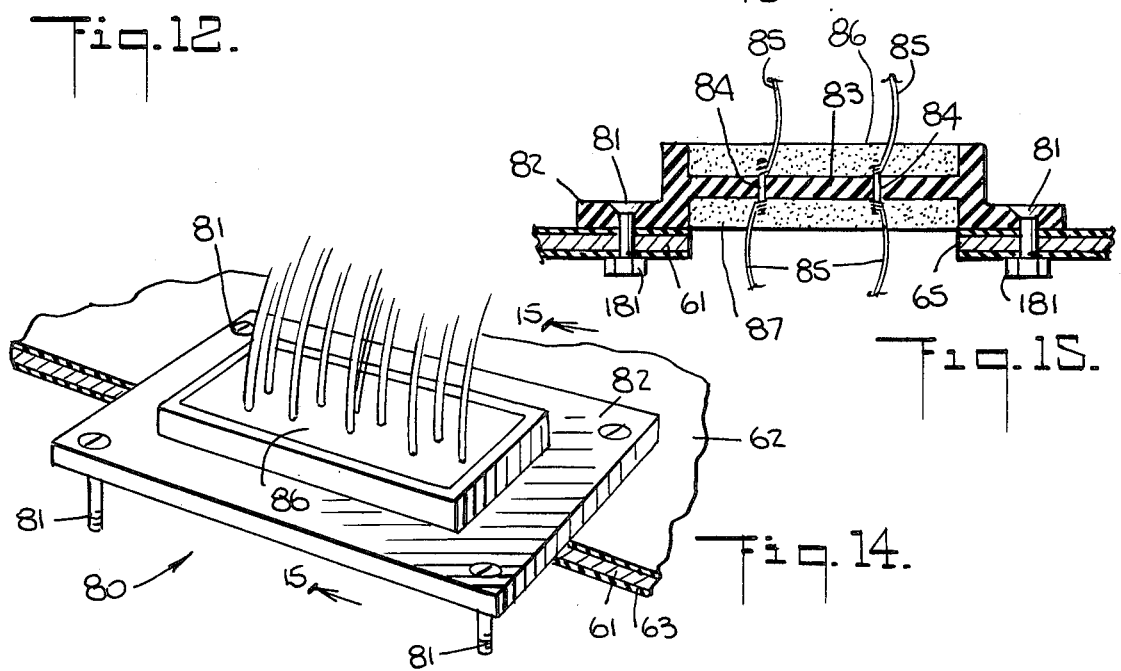

COMPARTMENTALIZED SPLICE CASE

BACKGROUND OF THE INVENTION

The present invention relates to cable splices and, more particularly, to the various systems for splicing together different cable types heretofore requiring inter-cable isolation.

By way of background, an example of a procedure for interconnecting a filled (waterproof) cable with a gas pressurized cable is to splice a short section of air core cable, typically 20 feet long, to the end of the cable to be pressurized. Such short lengths are commonly called "STUBS" and are usually made with plastic insulated conductors. The stub is provided with an air dam which acts as a pressure plug to secure the pressurizing medium of the system to which it is attached. The opposite end of the stub from the end spliced to the pressurizeable cable is then spliced to the filled cable.

Each of the splices mentioned above is generally constructed by bringing the cable ends together within a splice case, a housing consisting generally of two semicylindrical shell parts with integral flanges that are brought together about the spliced cable ends over interposed end plugs to provide an hermetically sealed enclosure. The enclosure can then be pressurized or filled as necessary. The above mentioned installation, therefore, requires two such splice cases in addition to the stub.

When pulp insulated cables are involved the splicing system must take into consideration the fact that pulp insulated conductors are relatively quite fragile and readily subject to damage from repeated handling. They are also very susceptible to moisture pick-up if left exposed to the atmosphere, a factor which further increases the fragility. Consequently, such cables are routinely pressurized, and re-entry into splice cases containing pulp insulated conductors is avoided wherever possible. To facilitate reentry while minimizing the problem, some installation instructions recommend the use of a second stub and a third splice case in the transition from a pulp cable system to a waterproof cable. In such arrangement, the second stub is connected in series with the first stub with a second pressure dam located in the second stub. The third splice case is reenterable and located surrounding the splice between the two stubs. In such installations the use of a by-pass air pipe is recommended to pressurize the air core sections of the stubs between the pressure dams.

It is, therefore, an object of the present invention to provide a novel splice case that permits establishing a splice between dissimilar or incompatible cables entirely within the single case, eliminating both the need for stubs and additional splice cases.

Another object of the present invention is to eliminate a shortcoming of current practice which fails to preclude leaving a section of an air core stub unpressurized.

Another object of the present invention is to provide a more economical system for splicing together dissimilar or incompatible cables.

A still further object of the present invention is to provide a splice connection that requires much less time for initial installation and for post-installation servicing when repair or other entry is necessitated.

SUMMARY OF THE INVENTION

In accordance with the present invention there is provided a splice case for enclosing and protecting spliced connections between the conductors of a plurality of cables, said case comprising in combination a multipart housing for enclosing said spliced connections, partition means within said housing for subdividing said housing into a plurality of separate compartments the interiors of which are hermetically isolated one from the other when the housing is assembled, a plurality of mutually insulated electrically conductive elements mounted on said partition means and passing therethrough from one of said compartments to another of said compartments while hermetically sealed to said partition means, entry means for accommodating entry of external cables, and means within said housing for selectively establishing connection between said electrically conductive elements and conductors of a cable entering said splice case.

BRIEF DESCRIPTION OF THE DRAWINGS

The invention will be better understood after reading the following detailed description of the presently preferred embodiments thereof with reference to the appended drawings in which:

FIG. 3 is a perspective view of an assembled splice case embodying the present invention showing by way of example two cables entering, one from each end;

FIG. 4 is an exploded perspective view of the splice case of FIG. 3 showing the individual parts thereof;

FIG. 5 is a top plan view of the partition member that is shown in FIG. 4;

FIG. 6 is a side view of the partition member of FIG. 5;

FIG. 7 is a fragmentary sectional view drawn to an enlarged scale taken along line 7—7 in FIG. 5 and showing details of the electrically conductive elements that establish electrical connection through the partition member;

FIG. 8 is an enlarged fragmentary detail view of the area shown within the broken line outline designated by the numeral 8 in FIG. 7;

FIG. 9 is a side elevational view of the assembly of FIG. 3 with sections of the cylindrical housing parts broken away;

FIG. 10 is an enlarged fragmentary sectional view taken along the line 10—10 in FIG. 3 and showing details of the threaded stud fastening members provided along the border of the partition member;

FIG. 11 is an exploded perspective view of a modified partition member that can be used in the splice case shown in FIG. 3 and which includes removable modules in which the electrically conductive elements are mounted;

FIG. 12 is an enlarged fragmentary sectional view taken along line 12—12 in FIG. 11 and showing details of both the threaded studs for securing the housing parts thereto and the adjacent elastomeric sealing media;

FIG. 13 is an enlarged fragmentary sectional view taken along the same section line as the view of FIG. 12, but including the adjacent housing portions and the clamping arrangement not otherwise shown in FIG. 11, and includes a showing of a modification of the embodiment of FIGS. 3 to 10 wherein the housing parts are lined with elastomeric material;

FIG. 14 is an enlarged perspective view of a module of the type useable in the embodiment of FIG. 11; and FIG. 15 is a vertical sectional view taken along the line 15—15 in FIG. 14.

The same reference numerals are used throughout the drawings to designate the same or similar parts.

DETAILED DESCRIPTION OF THE PRESENTLY PREFERRED EMBODIMENTS

Figure 1:
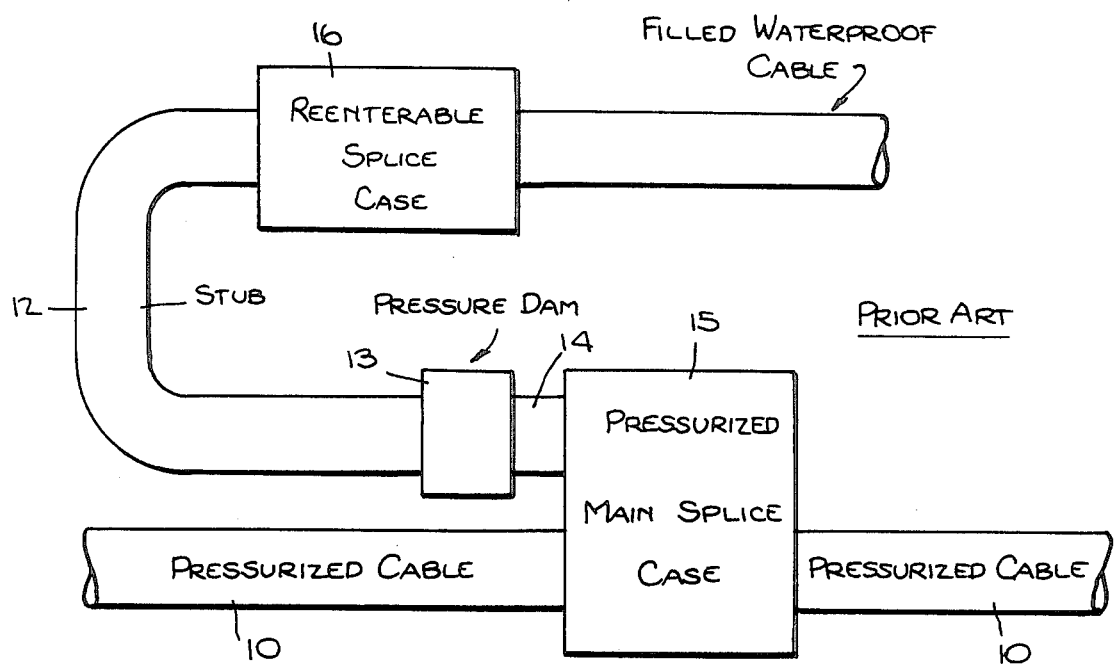
FIG. 1 is a schematic diagram showing a prior art arrangement for joining a pressurized cable to a filled waterproof cable using one stub and two splice cases.

Referring to the drawings, and in particular to FIG. 1, there is illustrated schematically therein a prior art arrangement for joining a pressurized cable 10 to a filled waterproof cable 11. For this purpose, an air core stub 12, for example 20 feet long, furnished with a pressure dam 13 near the end 14, is joined by splicing within the splice cases 15 and 16 to the cables 10 and 11, respectively. The splice cases 15 and 16 consist generally of two semicylindrical shell parts with integral flanges that are brought together about the spliced cable ends over interposed end plugs to provide an hermetically sealed enclosure. After completion of the necessary splices, and installation of the known splice cases 15 and 16, the case 15 along with the cable 10 and section 14 of the stub 12 are pressurized with a suitable medium, generally an inert gas. While the splice case 15 can be filled with a suitable insulative composition compatible with the filled cable 11, the case is often left unfilled to facilitate reentry.

Figure 2:
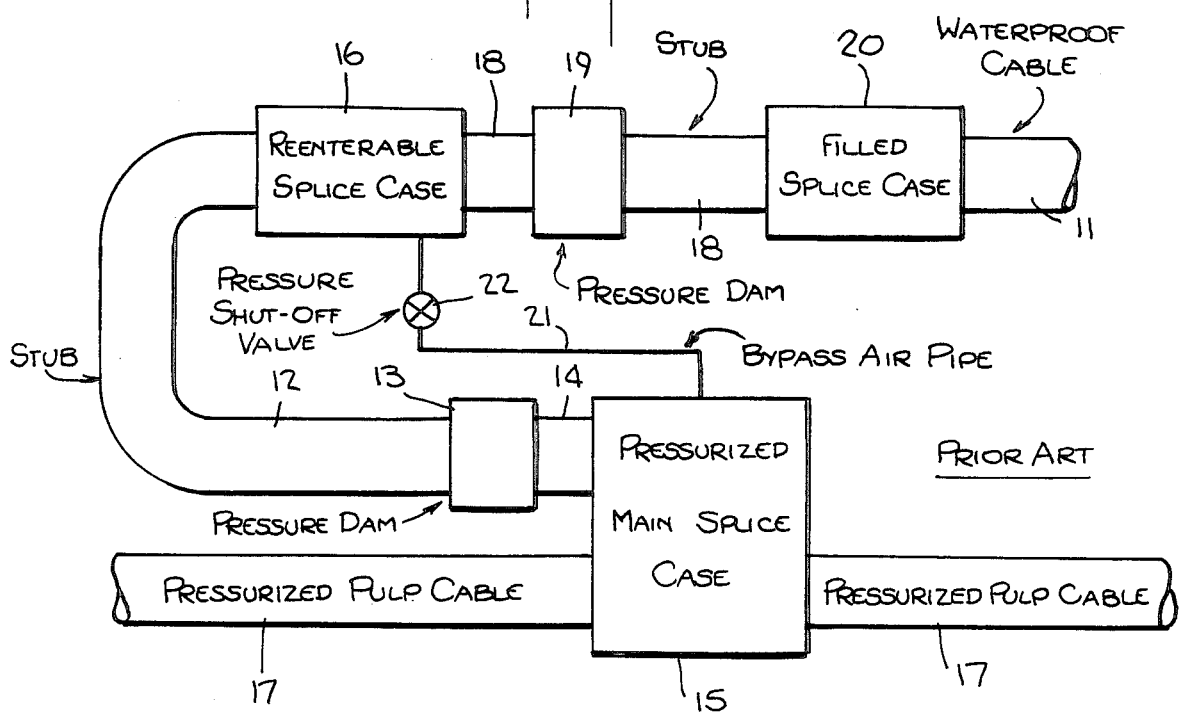
FIG. 2 is a schematic diagram showing another prior art arrangement wherein two stubs and three splice cases are employed along with a bypass air pipe.

As mentioned above, a second stub and third splice case are sometimes used to facilitate reentry. An example of this arrangement is illustrated in FIG. 2 to which attention should now be directed. A pulp insulated cable 17 that requires pressurization passes through the splice case 15. Within the splice case 15, the end 14 of the air core stub 12 is spliced to the cable 17 in a manner similar to the arrangement previously described with reference to FIG. 1. Unlike the arrangement of FIG. 1, however, a second stub 18, provided with a pressure dam 19 is spliced to the first stub 12 within the reenterable splice case 16. The free end of stub 18 is spliced to the waterproof cable 11 within another splice case 20. A bypass air line or pipe 21 provided with a pressure shut-off valve 22 interconnects the splice case 15 with the reenterable splice case 16. With this arrangement, during pressurization of the main splice case 15, the valve 22 is open to establish communication with the splice case 16 for the purpose of pressurizing both the splice case 16 and the sections of stubs 12 and 18 located between the two dams 13 and 19.

When it is necessary or desired to alter the pair connections between cables 11 and 17, entry is accomplished via the reenterable splice case 16. Valve 22 can be closed to isolate the splice case 16 along with the stub sections that extend between pressure dams 13 and 19 from the pressurized pulp cable 17. The pressure in splice case 16 is released and the case can be opened to work on the splice. Thereafter the case 16 can be closed and valve 22 re-opened to re-pressurize the system. With this arrangement the recommended procedure is to fill the splice case 20 in order to better protect the cable 11. However, the need to reenter splice case 20 is minimized by reason of the provision of splice case 16 with its additional stub and dam isolation.

The two arrangements described above with reference to FIGS. 1 and 2 represent prior art and have been described briefly by way of background. Attention should now be directed to FIGS. 3 to 10 of the drawings wherein a first embodiment of the present invention is illustrated. A splice case, designated generally by the reference numeral 30, is shown in FIG. 3 enveloping a splice between cables 31 and 32. The case 30 consists of semicylindrical housing parts 33 and 34 with radially outwardly directed flanges 35, 36 and 37, 38, respectively; semicircular end plug members 39, 40, 41 and 42; and partition member 43.

Each of the end plug members is in two parts that are fastened together by suitable bolts or the like. See, for example, the parts 44 and 45 of plug member 39. As shown in FIGS. 3 and 4, the plug member 39 is drilled with a bore 46 straddling the parting line 47 between parts 44 and 45. This follows known practice wherein multipart end plugs are furnished to the cable installer who then drills the desired bore for accommodating the particular size cable being spliced. After drilling, the end plug parts are disassembled and then reassembled about the end of a cable.

Presently known splice cases do not have a subdividing partition 43. Therefore, the cable entry bore is usually located centered about the diametral parting line. However, the instant embodiment provides for a gap between the end plug halves 39-40 and 41-42 to accommodate the thickness, e.g. ¼ inch, of the partition member 43. See FIG. 9 where the housing has been broken away to show the end plugs and cables.

Referring more particularly to FIGS. 5 to 8, it will be seen that the partition member 43 has an array of laterally spaced apart metallic pins 48 that pass through the partition member 43. Pin 48 can be a conventional wire wrap pin, for example of phosphor bronze 0.045"×0.045"×0.850 in dimension, and press fit through the partition 43. As best seen in FIG. 7, the pins 48 extend equally above and below the partition member 43. Each of the ends of the pins 48 has conductively attached thereto an end 49 of a separate length of insulated wire. In this way separate cable "tails" are joined to the pins 48 on each side of the partition. As shown in the detail of FIG. 8, the connections are made by a known wire wrapping or winding technique.

Surrounding the array of pins 48 on each side of partition 43 are encircling dams 50 and 51 provided by upstanding walls formed integral with the partition 43. The dams 50 and 51 are high enough that when suitable potting material is introduced to fill the area bounded by the dams, all of the wire-pin connections are embedded, and hermetic sealing thereof is ensured.

As illustrated, the free ends of the wires on each side of partition 43 form a "cable tail" about three feet long to the end of which may be attached one or more standard 25 pair connectors, or the like. See the connectors 53 and 54. Cables 31 and 32 entering splice case 30 are provided with plugs that match the connectors 53 and 54, and are thus plug connected to the "cable tail" on the corresponding side of partition 43, and the cables are thus efficiently spliced together via the pass-through conductors.

Located around the perimeter of partition member 43 are a plurality of threaded studs 55, one of which is shown in detail in FIG. 10. The stud 55 has a radially enlarged midsection 56 embedded in partition 43 which latter is preferably molded or formed from ABS (acrylonitrile butadiene styrene) resin. Thus, the stud 55 is anchored in the partition 43 and can be used to fasten the housing parts 33 and 34 to opposite sides independently of each other.

For the purpose of establishing an hermetic seal between the parts, a suitable gasket 57 is provided around the partition 43 on each side of partition 43 adjacent the side margins thereof. The end plug members 39 to 42 are provided with suitable seals to sealingly engage the respective ends of the housing parts 33 and 34.

In use, only that side of partition member 43 that is connected to a pressurized cable need be pressurized. Since each side is hermetically isolated from the other, the other side can be supplied with any necessary environment to match an associated cable or cables. The splice case permits differential pressurization, and, because of the independently openable compartments, servicing and repair is greatly facilitated. While a pressurized side of the case can be entered, if necessary, by first releasing the pressure in known fashion, an unpressurized and unfilled side can be opened at will.

Depending upon the size of the splice case, any number of wire pairs can be brought through the partition member and sealed therein. More than one plug connector can be used and various groupings can be used as required. Alternatively, the wires can be brought in without plugs and the cable tail can be furnished without plugs so that any suitable splicing technique can be used, as desired. Conversely, any known connector device can be employed.

At present the potting material used is a polyurethane resin. The individual wires can be, for example, 24 AWG solid copper with high density polyethylene (HDPE) insulation. The dimensions given above relate to pins 48 having a square rectangular cross section, but any non-circular cross section presenting sharp edges can be employed, the better to secure good electrical contact with the wire wrap.

Any suitable type of threaded fastener such as nuts 58 can be applied to the studs 55. See FIG. 10.

The splice case described with reference to FIGS. 3 to 10 is believed to be adequate for the smaller size splice cases, say, three or four inches in overall diameter. However, as the case gets larger, problems may be encountered in providing a partition member having sufficient strength to resist deformation under the usual pressures encountered in the field. Under such circumstances the problem can be alleviated by using the construction to be described with reference to FIGS. 11 to 15. As will appear to the reader, the embodiment to be described has a number of desirable advantages.

Referring to FIGS. 11 to 15, there is illustrated a partition member 60 consisting of a steel plate 61, preferably stainless steel, coated on each face with a suitable layer 62 and 63, respectively, of neoprene or other elastomeric material. A series of openings, four openings 64, 65, 66 and 67 being shown, of rectangular or other suitable configuration are formed through the plate 61, each opening being bordered by a series of holes 68.

As shown in detail in FIG. 12, a plurality of threaded studs 70 are secured by nuts 71 to the plate 61 around its perimeter. When the splice case halves 72 and 73 are assembled to plate 61 as shown in detail in FIG. 13, channel members 74 and 75 can be installed and secured by additional nuts 76.

Referring now specifically to FIGS. 11, 14 and 15, it will be observed that the cable tails are mounted in individual selectably mountable and demountable modules 80, formed from suitable plastic, and arranged to be fastened to plate 61 over an opening, e.g., opening 65, by means of screws or bolts 81 passing through respective holes 68 and secured by nuts 181. The module 80 has a mounting flange 82 supporting a raised partition 83 into which are mounted a suitable array of pins 84. The pins 84 can be the same or similar to the pins 48 described with reference to FIGS. 7 and 8. The bared ends of insulated wires 85 can be secured to the pins 84 by wrap connection with all connections embedded in potting material 86 and 87, all similar to the arrangement of FIGS. 7 and 8. Each module 80 can be provided with a convenient number of pairs, say 100 pairs, and any number of modules up to the limit of the provided openings in plate 61 can be utilized. The remaining openings 64 to 67 in plate 61 are sealed off or occluded by suitable cover plates 90, threadedly joined to plate 61, as shown. The cover plates 90 can be constructed of any suitable metal or plastic.

Referring to FIGS. 1 and 2, it should be understood that the main feeder cable, which is the cable 10 or 17, passes through the splice case and can have as many as 1800 wire pairs or more. On the other hand in a typical installation the auxiliary cable splice to the main cable may have only a few hundred pairs, for example 300. Consequently, more space is required on the side of the splice case that harbors the main feeder cable. Such additional space is provided by the embodiment of FIGS. 11 to 15 since the modules 80 are mountable all on one side of plate 61, and, with the construction best seen in FIG. 15, the module does not project through to the other side of plate 61.

As best seen in FIG. 13, the metal case halves 72 and 73 are furnished on their interior surfaces with bonded coating layers 95 and 96, respectively, of neoprene or other suitable insulative elastomeric material. The coating layers 62,63 and 95,96 cooperate in the flange regions to hermetically seal the junction between a case half and the partition member 60. If the individual modules 80 are provided with independent gasketting material, the neoprene layers 62 and 63 on plate 61 can be omitted.

The neoprene coated metal case halves 72 and 73 shown in FIG. 13 can be employed in the embodiment of FIGS. 3 to 10, in which case the separate gaskets 57 can be eliminated.

Having described the presently preferred embodiment of the invention, it should be understood that various changes can be introduced without departing from the true spirit of the invention as defined in the appended claims. For example, more than one partition can be incorporated to subdivide the case into more than two compartments.

What is claimed is:

1. A splice case for enclosing and protecting field spliced connections between the conductors of a plurality of cables, said case comprising in combination a multipart housing having housing parts that provide walls for enclosing said spliced connections, common-wall partition means for dispositon between adjacent housing parts for subdividing said housing into a plurality of separate compartments the interiors of which are hermetically isolated one from the other when the housing assembled, means for separably securing said housing parts to said common-wall partition means with each said housing part being individually and selectively separable from said common-wall partition means for enabling access to one of said compartments while all other compartments remain sealed, a plurality of mutually insulated electrically conductive elements mounted on said partition means and passing therethrough without interruption from one of said compartments to another of said compartments while hermetically sealed to said partition means, entry means included in said housing walls for accommodating entry to said housing of external cables, and means within said housing for selectively establishing connection between said electrically conductive elements and conductors of a cable entering said splice case.

2. A splice case according to claim 1, wherein said electrically conductive elements comprise an array of laterally spaced apart metallic pins that pass through said partition means.

3. A splice case according to claim 2 wherein said connection establishing means comprise an assemblage of separate lengths of insulated wire where each of the ends of said pins is conductively attached to an end of a different one of said separate wires.

4. A splice case according to claim 3, wherein said array of pins has said pin ends embedded in a body of insulating potting material on each side of said partition means, said potting material being bordered by an encircling wall formed integal with said partition means.

5. A splice case according to claim 4, wherein each of said pins has a non-circular cross-section, and each said insulated wire has an uninsulated end portion wrapped about the corresponding said pin within said potting material.

6. A splice case according to claim 5, wherein sealing means are provided on each side of said partition means for establishing hermetic seals between said partition means and said housing parts that are assembled thereto.

7. A splice case according to claim 6, wherein said partition means is provided around its perimeter with a plurality of spaced apart threaded studs for separably securing each of the housing parts to said partition means.

8. A splice case according to claim 7, wherein the free ends of said lengths of insulated wire are connected to means for establishing separable plug-together connections with complemental incoming cable connectors.

9. A splice case according to claim 3, wherein the free ends of said lengths of insulated wire are connected to means for establishing separable plug-together connections with complemental incoming cable connectors.

10. A splice case according to claim 3, wherein each of said pins has a non-circular cross-section, and each said insulated wire has an uninsulated end portion wrapped about the corresponding said pin.

11. A splice case according to claim 3, wherein sealing means are provided on each side of said partition means for establishing hermetic seals between said partition means and said housing parts that are assembled thereto.

12. A splice case according to claim 11, wherein said partition means is provided around its perimeter with a plurality of spaced apart threaded studs for separably securing each of the housing parts to said partition means.

13. A splice case according to claim 1, wherein sealing means are provided on each side of said partition means for establishing hermetic seals between said partition means and said housing parts that are assembled thereto.

14. A splice case according to claim 13, wherein said partition means is provided around its perimeter with a plurality of spaced apart threaded studs for separably securing each of the housing parts to said partition means.

15. A splice case according to claim 1, wherein said electrically conductive elements are mounted in a module detachably secured over an opening in said partition means.

16. A splice case according to claim 1, wherein said partition means comprises a wall having a plurality of apertures therethrough for permitting communication between adjacent ones of said compartments, at least one module detachably secured to said wall over one of said apertures with a continuous seal between said module and said wall around the entire perimeter of said one aperture, the remaining ones of said apertures being occluded hermetically by either additional modules or selectably removable cover plates, said modules having said electrically conductive elements extending therethrough and hermetically sealed thereto with respective ends of said conductive elements located in adjacent compartments.

17. A splice case according to claim 16, wherein each said module has a wall through which passes an array of laterally spaced apart metallic pins the ends of which have insulated conductors joined thereto, said pin ends being embedded in a body of insulating potting material with the insulated conductors extending therefrom.

18. A splice case for enclosing and protecting field spliced connections between the conductors of a plurality of cables, said case comprising in combination a multipart housing having housing parts that provide walls for enclosing said spliced connections, common-wall partition means for disposition between adjacent housing parts for subdividing said housing into a plurality of separate compartments the interiors of which are hermetically isolated one from the other when the housing is assembled, said partition means being provided around its perimeter with a plurality of sapced apart threaded stubs for separably securing each of the housing parts to said partition means, each said housing part being individually and selectively separable from said common-wall partition means for enabling access to one of said compartments while all other compartments remain sealed, a plurality of mutually insulated electrically conductive elements mounted on said partition means and passing therethrough without interruption from one of said compartments to another of said compartments while heretically sealed to said partition means, entry means included in said housing walls for accommodating entry to said housing of external cables, and means within said housing for selectively establishing connection between said electrically conductive elements and conductors of a cable entering said splice case.

* * * * *